United States Patent
Yang

(10) Patent No.: US 9,388,035 B2
(45) Date of Patent: Jul. 12, 2016

(54) QUANTITATIVE LIQUID DISCHARGE DEVICE CAPABLE OF DISCHARGING LIQUID IN CONTAINER AT PRESENT LIQUID LEVEL

(75) Inventor: Bangbing Yang, Shenzhen (CN)

(73) Assignee: SHENZHEN XINGRISHENG INDUSTRIAL CO., LTD., Shenzhen, Guangdong Province (CN)

( * ) Notice: Subject to any disclaimer, the term of this patent is extended or adjusted under 35 U.S.C. 154(b) by 113 days.

(21) Appl. No.: 14/401,303

(22) PCT Filed: May 15, 2012

(86) PCT No.: PCT/CN2012/075536
§ 371 (c)(1),
(2), (4) Date: Nov. 14, 2014

(87) PCT Pub. No.: WO2013/170447
PCT Pub. Date: Nov. 21, 2013

(65) Prior Publication Data
US 2015/0136242 A1 May 21, 2015

(51) Int. Cl.
*E03B 11/00* (2006.01)
*B67D 7/06* (2010.01)
*G05D 9/02* (2006.01)
*B67D 7/00* (2010.01)
*A01K 63/00* (2006.01)

(52) U.S. Cl.
CPC .............. *B67D 7/061* (2013.01); *A01K 63/006* (2013.01); *B67D 7/007* (2013.01); *G05D 9/02* (2013.01); *Y10T 137/2911* (2015.04)

(58) Field of Classification Search
CPC .................. B67D 1/0412; Y10T 137/86236
USPC ........... 137/331, 333, 395, 577, 590; 220/229
See application file for complete search history.

(56) References Cited

U.S. PATENT DOCUMENTS

| | | | | |
|---|---|---|---|---|
| 306,170 A * | 10/1884 | Moseley | .................... | C02F 1/02 137/577 |
| 571,350 A * | 11/1896 | Fayette | ................. | B01F 5/0496 137/205.5 |
| 932,878 A * | 8/1909 | May | ......................... | E03C 1/284 137/247.13 |
| 1,098,138 A * | 5/1914 | Tuyl | ......................... | B67D 1/04 137/209 |
| 1,132,350 A * | 3/1915 | Hyatt | ...................... | B60K 15/06 137/577 |
| 1,554,814 A * | 9/1925 | Glazner | ................. | B60K 15/06 137/385 |
| 1,684,475 A * | 9/1928 | Collier | .................... | B60P 3/224 137/546 |
| 3,326,264 A * | 6/1967 | Howard | ................. | B60K 15/06 137/398 |
| 5,979,492 A * | 11/1999 | Miller | ................... | F16K 11/076 137/426 |

* cited by examiner

*Primary Examiner* — Craig Schneider
*Assistant Examiner* — Angelisa L Hicks
(74) *Attorney, Agent, or Firm* — PROI Intellectual Property US

(57) ABSTRACT

Disclosed is a quantitative liquid discharge device capable of discharging liquid in a container at a preset liquid level. The device comprises a liquid discharge pipe, an outer sleeve and a liquid level control rod. The liquid discharge pipe is provided with a full-discharge liquid discharge port and at least one internal defined-level liquid discharge port. Installed outside the liquid discharge pipe, the outer sleeve is provided with an external defined-level liquid discharge port. The wall of the liquid level control rod is slidably sleeved between the wall of the liquid discharge pipe and the wall of the outer sleeve. The liquid level control rod is provided with a liquid guide port passing through the wall thereof. Provided between the walls of the outer sleeve and the liquid level control rod a sliding positioning assembly allows the liquid guide port to achieve liquid discharge at a defined liquid level.

10 Claims, 6 Drawing Sheets

US 9,388,035 B2

QUANTITATIVE LIQUID DISCHARGE DEVICE CAPABLE OF DISCHARGING LIQUID IN CONTAINER AT PRESENT LIQUID LEVEL

CROSS REFERENCE TO RELATED APPLICATIONS

The present application is the US national stage of International Patent Application PCT/CN2012/075536 filed on May 15, 2012.

TECHNICAL FIELD

The invention relates to fittings used for a liquid container, especially a device for discharging liquid in a container.

BACKGROUND ART

For large liquid containers, how to discharge liquid held inside is a common problem for users. For example, to ensure water quality, liquid in an aquarium tank is required to be changed at regular intervals. The common method of discharging liquid in a liquid container adopted by the prior art includes machine discharge and artificial discharge. As to the former, liquid in a container is discharged with water pump. As to latter, the simplest way is to scoop liquid continuously out from the container with a small container, such as water ladle or large spoon. Another commonly used artificial discharge method is to discharge liquid in a container with water pipe based on the siphon principle. However, no matter which of the above methods is adopted, discharge process is required to be monitored by people, so labor cost is essential. In particular, for the liquid discharge of an aquarium tank, water is required to be changed, without catching aquatic animals in the tank. Usually, liquid in the aquarium tank is required to be discharged quantitatively, instead of fully discharged, and amount of the water discharged is also required to be adjusted correspondingly. Therefore, liquid discharge process of the aquarium tank is required to be monitored more. Yet, with regards to the places with concentrated breeding of aquatic animals, there are different requirements on discharge volume for each aquarium tank. Nevertheless, with the liquid discharge method of the prior art, great amount of personnel are more needed for specialized monitoring of the discharge process. Thereby, labor cost is greater.

Therefore, a technology that can make liquid discharge operators free from being troubled by liquid discharge monitoring is required.

CONTENT OF THE INVENTION

The invention is intended to solve the technical issues by means of avoiding the deficiencies of the prior art, and put forward a quantitative liquid discharge device capable of discharging liquid in a container at preset liquid level.

The invention can solve the said technical issues with the following technical proposal:

A quantitative liquid discharge device capable of discharging liquid in a container at preset liquid level, comprising a tubular liquid discharge pipe installed in the liquid container. The liquid discharge pipe is provided with a full-discharge liquid discharge port running radially through the wall of the liquid discharge pipe. When the liquid discharge pipe is fixedly installed in the liquid container, the full-discharge liquid discharge port is located at the lowest liquid level in the liquid container. By means of the full-discharge liquid discharge port, all liquid in the liquid container can be discharged. In particular, it further comprises a tubular outer sleeve and a liquid level control rod. The liquid discharge pipe is further provided with at least one internal defined-level liquid discharge port, which is above the full-discharge liquid discharge port and runs radially through the wall of the liquid discharge pipe. The outer sleeve is fitted outside of the liquid discharge pipe, and provided with external defined-level liquid discharge ports running radially through the wall of the outer sleeve, with the same number as the internal defined-level liquid discharge ports. When the wall near the bottom of the outer sleeve covers the full-discharge liquid discharge port, the external defined-level liquid discharge ports are respectively of one-to-one correspondence to the positions of the internal defined-level liquid discharge ports. The wall of the liquid level control rod is slidably placed between the wall of the liquid discharge pipe and the wall of the outer sleeve. The liquid level control rod is provided with one flow guide port running radially through the liquid level control rod. A sliding positioning assembly is arranged between the wall of the outer sleeve and the wall of the liquid level control rod. By means of the sliding positioning assembly, the flow guide port of the liquid level control rod can be located respectively between each internal defined-level liquid discharge port and external defined-level liquid discharge port of one-to-one correspondence. Hence, the inside wall space of the liquid discharge pipe can be connected with the inside space the liquid container. Bedsides, by means of the wall of the liquid level control rod, the internal defined-level liquid discharge ports under the flow guide port are obstructed from being connected with the external defined-level liquid discharge ports. Moreover, by means of the sliding positioning assembly, when the flow guide port is located between a pair of internal defined-level liquid discharge port and external defined-level liquid discharge port with the same position, the outer sleeve and liquid level control rod are ganged, thereby the outer sleeve can make displacement together with the liquid level control rod along their central axis.

Specifically, the sliding positioning assembly comprises at least one outwardly projecting boss arranged at the outer wall of the liquid level control rod, at least one radial chute recessed inwardly processed on the inner wall of the outer sleeve, as well as at least one radial circular cylindrical locating slot recessed inwardly processed on the inner wall of the outer sleeve. The chutes and locating slot are connected. By means of the bosses sliding in the chutes, the liquid level control rod makes axial displacement. When the bosses are inside of the locating slot, the liquid level control rod can only rotate instead of making axial displacement. Thereby, the flow guide port is located between a pair of internal defined-level liquid discharge port and external defined-level liquid discharge port with the same position.

More specifically, the liquid discharge pipe is provided with two internal defined-level liquid discharge ports. Accordingly, the outer sleeve is also provided with two external defined-level liquid discharge ports. Two parallel chutes stretching axially along the outer sleeve are arranged at the uppermost inner face of the outer sleeve. The locating slot is located under and connected with the two chutes. The liquid level control rod is arranged with two bosses respectively corresponding to the position of the two chutes. When the two bosses slide into the locating slot from the two chutes, flow guide port of the liquid level control rod is located between the lowest pair of the internal defined-level liquid discharge port and external defined-level liquid discharge port.

Top nozzle of the liquid discharge pipe is sealed. Bottom nozzle of the liquid discharge pipe stretches out from the bottom face of the liquid container, serving as the liquid discharge port of the quantitative liquid discharge device. The bottom nozzle is detachably sealed.

The quantitative liquid discharge device further comprises a spacer. By means of ultrasonic or bonding process, the spacer is installed at the top nozzle of the liquid discharge pipe, for sealing the top nozzle of the liquid discharge pipe.

The quantitative liquid discharge device further comprises a rubber stopper. By means of the rubber stopper, bottom nozzle of the liquid discharge pipe can be detachably sealed.

Specifically, the wall of the liquid discharge pipe comprises a lower liquid discharge pipe wall and an upper liquid discharge pipe wall. Outer diameter of the lower liquid discharge pipe wall is greater than that of the upper liquid discharge pipe wall. Inner bottom wall of the outer sleeve can attach the outside of the lower liquid discharge pipe wall and slide. Wall of the liquid level control rod slides between the external wall surface of the upper liquid discharge pipe wall and internal wall surface of the outer sleeve.

To prevent the liquid level control rod from being pulled out between the liquid discharge pipe and the outer sleeve and separate, wall of the liquid level control rod comprises a lower control rod wall and an upper control rod wall. Inner diameter of the lower wall is greater than that of the upper wall. Top of liquid discharge pipe is arranged with at least one grab stretching out from the wall of the liquid discharge pipe along the radial direction. Outer diameter of the grab is greater than that of the wall of the liquid discharge pipe. Internal wall surface of the lower control rod wall attaches the external wall surface of the liquid discharge pipe, and slides under the grab.

The liquid level control rod further comprises a blind nut. The blind nut covers the top nozzle of the liquid level control rod, so as to seal the top nozzle of the liquid level control rod.

Seal rings are arranged above and below the full-discharge liquid discharge port, and each internal defined-level liquid discharge port of the liquid discharge pipe.

Compared with the prior art, technical effects of the invention "a quantitative liquid discharge device capable of discharging liquid in a container at preset liquid level" are that:

By operating the liquid level control rod, and setting the liquid level after drainage in the liquid container, liquid can be discharged, the discharge process does not require specialized monitoring, thus, operators are free from the trouble of discharge monitoring, and labor cost is saved.

MODE OF CARRYING OUT THE INVENTION MODEL

Figure 1:
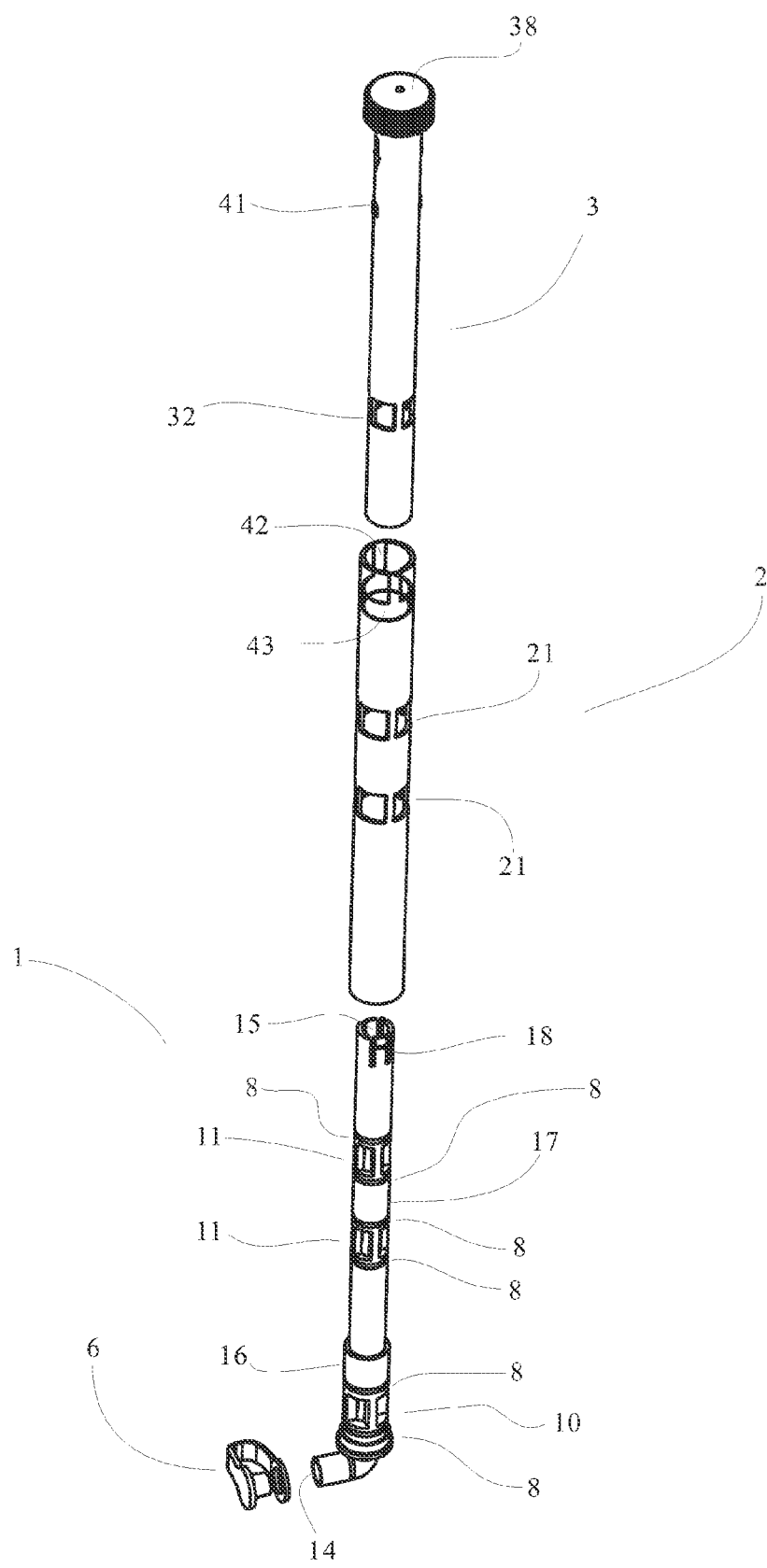
FIG. 1 shows an axonometric projection diagram of the preferred embodiment of the invention "a quantitative liquid discharge device capable of discharging liquid in a container at preset liquid level"
Figure 2:
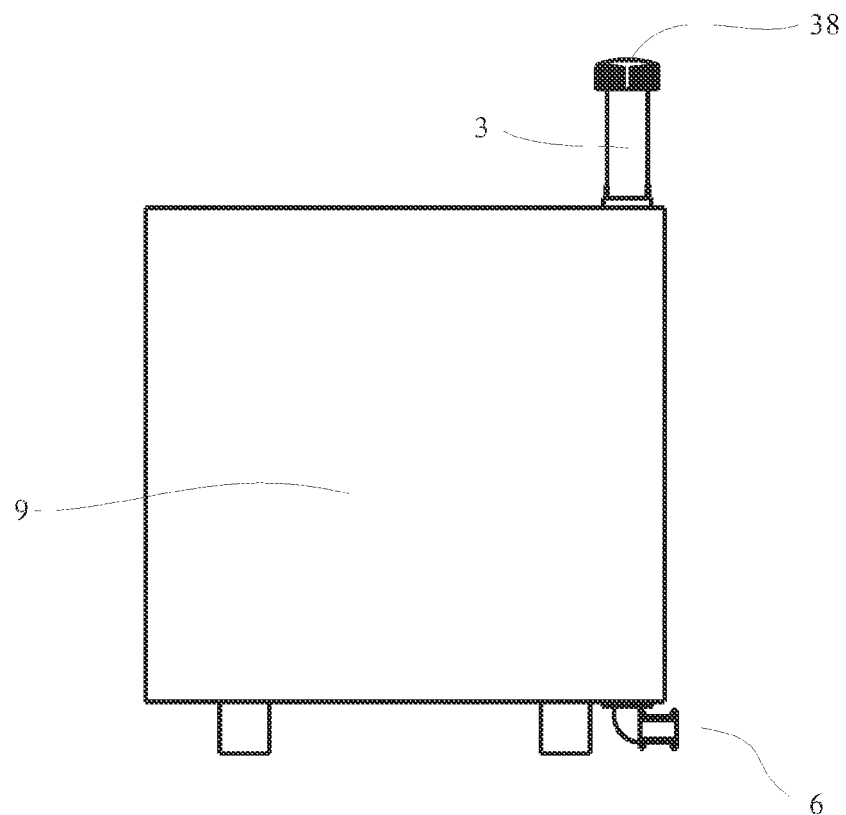
FIG. 2 shows a front view diagram of the orthogonal projection of the preferred embodiment.
Figure 3:
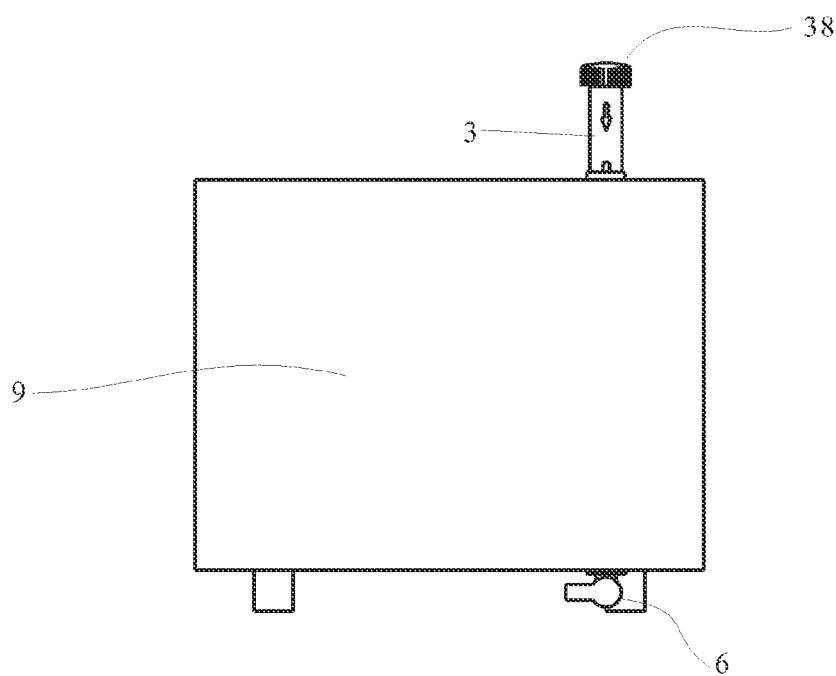
FIG. 3 shows a right view diagram of the orthogonal projection of the preferred embodiment.
Figure 4:
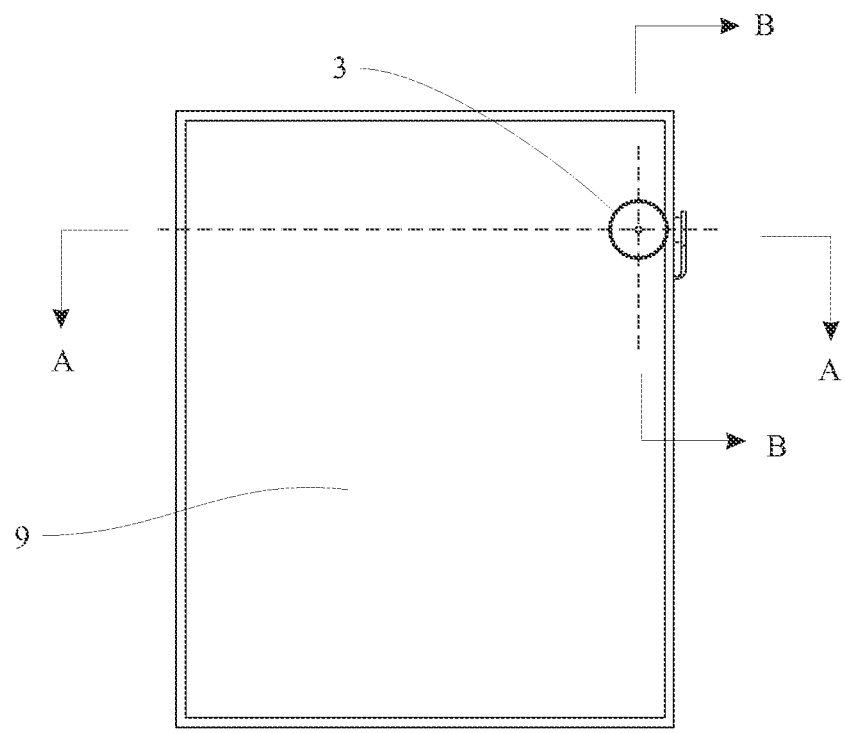
FIG. 4 shows a top view diagram of the orthogonal projection of the preferred embodiment.
Figure 5:
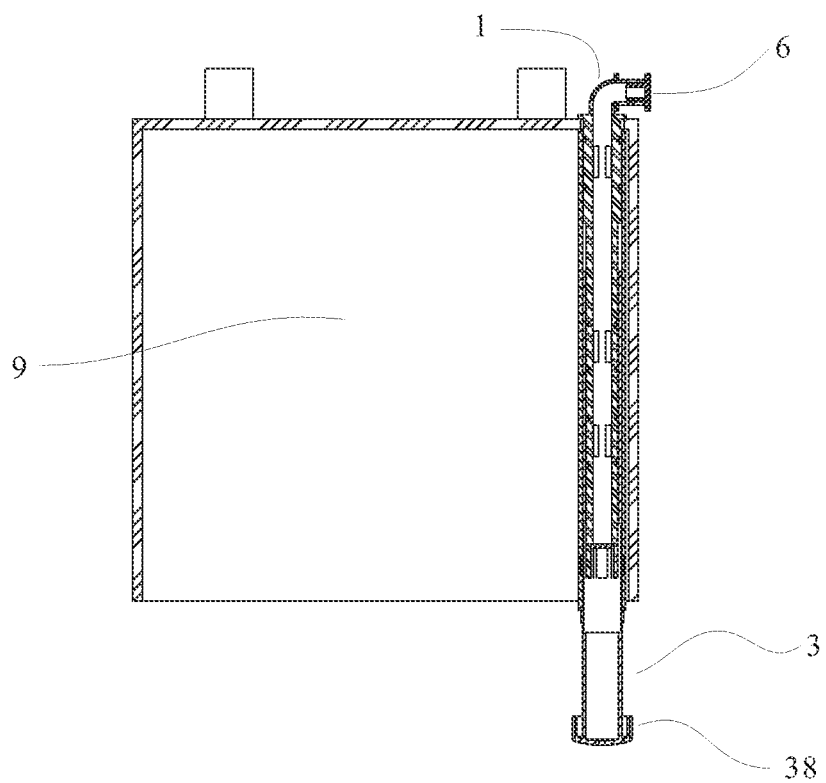
FIG. 5 shows an A-A sectional view of FIG. 4.

To further illustrate the principle and structure of the invention, the invention is further described in detail in accordance with the preferable embodiments shown in the figures.

The invention proposes a quantitative liquid discharge device capable of discharging liquid in a container at preset liquid level, shown from FIG. 1 to FIG. 8, comprising a tubular liquid discharge pipe 1 installed in the liquid container 9. The liquid discharge pipe 1 is provided with a full-discharge liquid discharge port 10 running radially through the wall of the liquid discharge pipe 1. When the liquid discharge pipe 1 is fixedly installed in the liquid container 9, the full-discharge liquid discharge port 10 is located at the lowest liquid level in the liquid container 9. By means of the full-discharge liquid discharge port 10, all liquid in the liquid container 9 can be discharged. The quantitative liquid discharge device further comprises a tubular outer sleeve 2 and a liquid level control rod 3. The liquid discharge pipe 1 is further provided with at least one internal defined-level liquid discharge port 11, which is above the full-discharge liquid discharge port 10 and runs radially through the wall of the liquid discharge pipe 1. The outer sleeve 2 is fitted outside of the liquid discharge pipe 1, and provided with external defined-level liquid discharge ports 21 running radially through the wall of the outer sleeve 2, with the same number as the internal defined-level liquid discharge ports 11. When the wall near the bottom of the outer sleeve 2 covers the full-discharge liquid discharge port 10, the external defined-level liquid discharge ports 21 are respectively of one-to-one correspondence to the positions of the internal defined-level liquid discharge ports 11. The wall of the liquid level control rod 3 is slidably placed between the wall of the liquid discharge pipe 1 and the wall of the outer sleeve 2. The liquid level control rod 3 is provided with one flow guide port 32 running radially through the liquid level control rod 3. A sliding positioning assembly is arranged between the wall of the outer sleeve 2 and the liquid level control rod 3. By means of the sliding positioning assembly, the flow guide port 32 of the liquid level control rod 3 can be located respectively between each corresponding internal defined-level liquid discharge port 11 and external defined-level liquid discharge port 21 of one-to-one correspondence. Hence, the inside wall space of the liquid discharge pipe 1 can be connected with the inside space of the liquid container 9. Bedsides, the internal defined-level liquid discharge ports 11 under the flow guide port 32 are hindered by the wall of the liquid level control rod 3, and fail to connect with the external defined-level liquid discharge ports 21. Moreover, by means of the sliding positioning assembly, when the flow guide port 32 is located between a pair of internal defined-level liquid discharge port 11 and external defined-level liquid discharge port 21 with the same position, the outer sleeve 2 and liquid level control rod 3 are ganged, thereby the outer sleeve 2 can make displacement together with the liquid level control rod 3 along their central axis. In the invention, as the corresponding internal defined-level liquid discharge ports 11 and external defined-level liquid discharge ports 21 are hindered by the wall of the liquid level control rod, only when the flow guide port 32 is located between a pair of internal defined-level liquid discharge port 11 and external defined-level liquid discharge port 21 with the same liquid level height, can the liquid discharge pipe 1 be connected with the liquid container 9, liquid in the liquid container 9 can be discharged, and the discharged liquid is the liquid in the liquid container 9 above the liquid level where the flow guide port 32 is located, thus quantitative discharge is realized. Moreover, so long as the liquid discharge height is set, namely the locating position of the flow guide port 32 of the liquid level control rod 3 is set, liquid can be discharged without artificial monitoring, and labor cost is saved as compared with the prior art.

In the preferred embodiment of the invention, as is shown in FIG. 1, the sliding positioning assembly comprises at least one outwardly projecting boss 41 arranged at the external wall surface of the liquid level control rod 3, at least one radial chute 42 recessed inwardly processed on the inner wall of the outer sleeve 2, as well as at least one radial circular cylindrical locating slot 43 recessed inwardly processed on the inner wall surface of the outer sleeve 2. The chutes 42 and the locating slot 43 are connected. By means of the bosses 41 sliding in the chutes 42, the liquid level control rod 3 makes axial displacement. When the bosses 41 are located inside of the locating slot 43, the liquid level control rod 3 can only rotate instead of making axial displacement. Thereby, the flow guide port 32 is located between a pair of internal defined-level liquid discharge port 11 and external defined-level liquid discharge port 21 with the same position. The locating slot 43 and bosses 41 are coordinated to complete positioning of the liquid level control rod 3. Each locating slot 43 is respectively set at different height based on the distance between each pair of internal defined-level liquid discharge port 11 and external defined-level liquid discharge port 21. The chutes 42 are mainly used for connecting each locating slot 43, and guiding bosses 41 to slide in the chutes 42, so as to enter into each locating slot 43. The sliding positioning assembly can also be pit and ball arranged respectively between the wall of the outer sleeve 2 and the liquid level control rod 3 in pairs. By means of the balls, liquid level control rod 3 slides, and by means of the balls sliding into the pit, position of the liquid level control rod 3 is fixed.

In the preferred embodiment of the invention, three-level water discharge is realized.

Two pairs of internal defined-level liquid discharge ports 11 and external defined-level liquid discharge ports 21 are set, so as to realize three-level water discharge function featured by two level heights and full liquid discharge. The liquid discharge pipe 1 is provided with two internal defined-level liquid discharge outlets 11, accordingly, the outer sleeve 2 is also provided with two external defined-level liquid discharge outlets 21. Two parallel chutes 42 stretching axially along the outer sleeve 2 are arranged at the uppermost inner face of the outer sleeve 2. The locating slot 43 is located under and connected with the two chutes 42. The liquid level control rod 3 is arranged respectively with two bosses 41 corresponding to the position of the two chutes 42. When the two bosses 41 slide into the locating slot 43 from the two chutes 42, flow guide port 32 of the liquid level control rod 3 is located between the lowest pair of the internal defined-level liquid discharge port 11 and external defined-level liquid discharge port 21. In the preferred embodiment of the invention, straight-line chutes 42 with straight center line are adopted. Besides, chutes with helical center line can also be adopted, so that the liquid level control rod 3 can rotate and make up and down displacement.

To prevent liquid inside of the liquid container 9 from flowing into the liquid discharge pipe 1 from the top of the liquid discharge pipe 1, top nozzle 15 of the liquid discharge pipe 1 is sealed. The invention applies to artificial discharge and machine discharge. As to the latter, pipe of water pump can be inserted into the inner bottom of the liquid discharge pipe. In the preferred embodiment of the invention, the proposal adopted is simpler than that of machine discharge, namely, bottom nozzle 14 of the liquid discharge pipe 1 stretches out from the bottom face of the liquid container 9, serving as the liquid discharge port of the quantitative liquid discharge device, the bottom nozzle 14 is detachably sealed. Water is discharged and stopped to be discharged by sealing or opening the bottom nozzle 14.

The liquid discharge pipe 1 further comprises a spacer 5. By means of ultrasonic or bonding process, the spacer 5 is installed at the top nozzle 15 of the liquid discharge pipe 1, for sealing the top nozzle 15 of the liquid discharge pipe 1.

The liquid discharge pipe 1 further comprises a rubber stopper 6. By means of the rubber stopper 6, bottom nozzle 14 of the liquid discharge pipe 1 can be detachably sealed.

Figure 6:
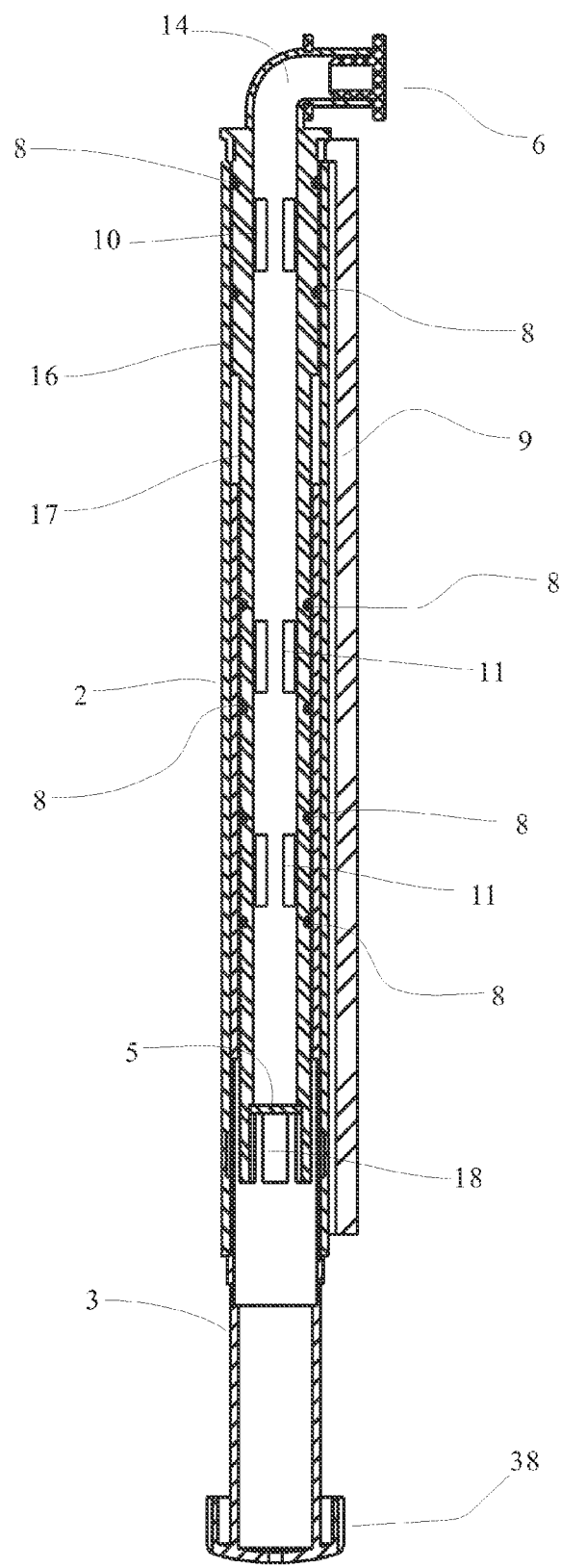
FIG. 6 shows an enlarged view of the quantitative liquid discharge device stated in FIG. 5.
Figure 7:
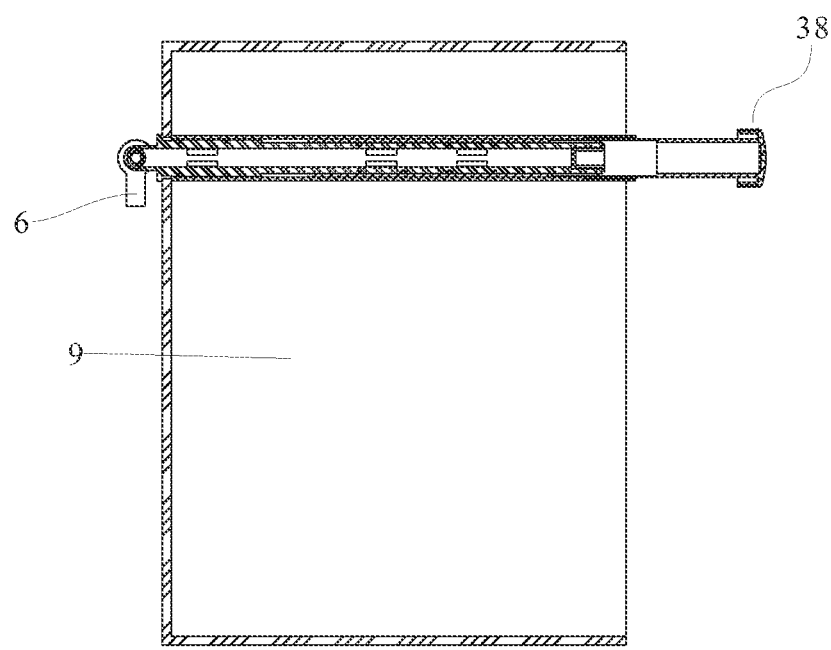
FIG. 7 shows a B-B sectional view of FIG. 4.
Figure 8:
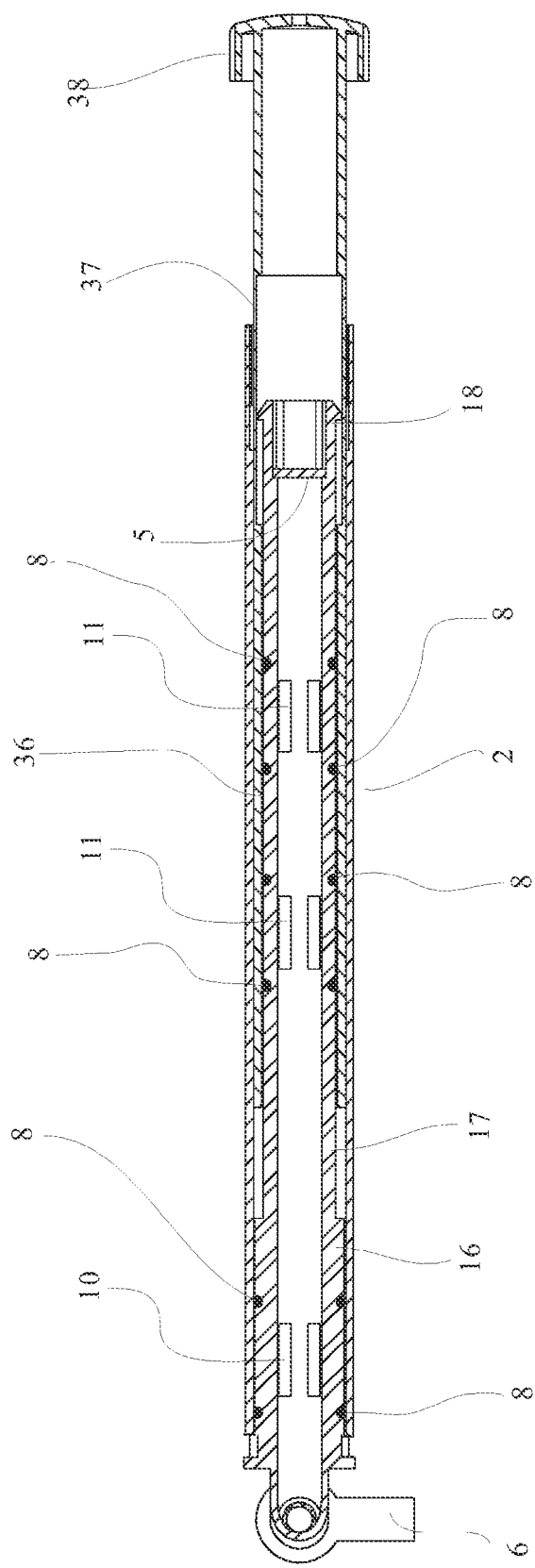
FIG. 8 shows an enlarged view of the quantitative liquid discharge device stated in FIG. 7.

In the preferred embodiment of the invention, as is shown in FIG. 6 and FIG. 8, wall of the liquid discharge pipe 1 comprises a lower liquid discharge pipe wall 16 and an liquid discharge pipe upper wall 17. Outer diameter of the lower liquid discharge pipe wall 16 is greater than that of the upper liquid discharge pipe wall 17. The bottom internal wall of the outer sleeve 2 can attach the outside of the lower wall 16 and slide. Wall of the liquid level control rod 3 slides between the external face of the upper liquid discharge pipe wall 17 and internal wall face of the outer sleeve 2.

When lifting the liquid level control rod 3, to keep liquid level control rod 3 from being pulled out between the liquid discharge pipe 1 and the outer sleeve 2, in the preferred embodiment of the invention, wall of the liquid level control rod 3 comprises a lower control rod wall 36 and an upper control rod wall 37. Inner diameter of the lower wall 36 is greater than that of the upper wall 37. Top of the liquid discharge pipe 1 is radially arranged with at least one grab 18 stretching out from the wall of the liquid discharge pipe 1. Outer diameter of the grab 18 is greater than that of the wall of the liquid discharge pipe. Inside surface of the lower control rod wall 36 attaches the outside wall surface of the liquid discharge pipe 1 and slides under the grab 18.

The liquid level control rod 3 further comprises a blind nut 38. The blind nut 38 covers the top nozzle of the liquid level control rod 3, so as to seal the top nozzle of the liquid level control rod 3.

To prevent liquid in the liquid container 9 from leaking between the liquid discharge pipe 1, outer sleeve 2 and liquid level control rod 3, in the preferred embodiment of the invention, seal rings 8 are arranged above and under the full-discharge liquid discharge port 10 and each internal defined-level liquid discharge port 11 of the liquid discharge pipe 1.

The rubber stopper 6 and seal rings 8 play the role of dual protection. When the seal rings 8 lose efficacy due to long-term use, etc., the rubber stopper 6 can also play the role of preventing the liquid in the liquid container 9 from leaking via the quantitative liquid discharge device.

In the preferred embodiment of the invention, the internal defined-level liquid discharge port below is arranged at the ½ liquid level of the liquid container 9, and the internal defined-level liquid discharge port above is arranged at the ⅔ liquid level of the liquid container 9. Original state of the quantitative liquid discharge device is that, bosses of the liquid level control rod 3 are located at the top end face of the outer sleeve 2, without sliding into the chutes 42. Operation process of the quantitative liquid discharge device is stated blow:

Pull the liquid level control rod 3 from the original state, as blocked by the grab 18, when the rod is pulled to the maximal displacement position, the flow guide port is located between the internal and external defined-level liquid discharge port 11 and 21 of the ⅔ liquid level. By means of opening the rubber stopper 6, ⅓ liquid in the liquid container 9 will be discharged.

Rotate the liquid level control rod 3 from the original state to the bosses 41, till sliding into the chutes 42, press the liquid level control rod 3 down, so that the bosses 41 can slide into the locating slot 43. Thus, the flow guide port 32 is located between the internal and external defined-level liquid discharge port 11 and 21 of the ½ liquid level. Open the rubber stopper 6, so that ½ liquid in the liquid container 9 will be discharged.

Rotate the liquid level control rod 3 from the original state to the bosses 41, till sliding into the chutes 42, press the liquid level control rod 3 down, so that the bosses 41 can slide into the locating chute 43. Soon afterwards, rotate the liquid level control rod 3, so that the bosses 41 can't slide into the chutes 42 from the locating slot 43, thereby enabling the liquid level control rod 3 to connect with the outer sleeve 2. Pull the liquid level control rod 3 upward, enabling the outer sleeve 2 to move upward together with the liquid level control rod 3, thereby the full-discharge liquid discharge port 10 will no longer be covered by the wall near the bottom of the outer sleeve 2, and internal wall space of the liquid discharge pipe 1 connects with the inner space of the liquid container 9 via the full-discharge liquid discharge port 10. Open the rubber stopper 6, so that all the liquid in the liquid container 9 can be discharged.

What is claimed is:

1. A quantitative liquid discharge device capable of discharging liquid in a container at preset liquid level, comprising a tubular liquid discharge pipe installed in the liquid container; the liquid discharge pipe is provided with a full-discharge liquid discharge port running radially through the wall of the liquid discharge pipe, when the liquid discharge pipe is fixedly installed in the liquid container, the full-discharge liquid discharge port is located at the lowest liquid level in the liquid container, by virtue of the full-discharge liquid discharge port, all liquid in the liquid container can be discharged; featuring that:

it further comprises a tubular outer sleeve and a liquid level control rod;

the liquid discharge pipe is also provided with at least one internal defined-level liquid discharge port, which is above the full-discharge liquid discharge port and runs radially through the wall of the liquid discharge pipe;

the outer sleeve is cased outside of the liquid discharge pipe; the outer sleeve is provided with external defined-level liquid discharge ports, with the same number as the internal defined-level liquid discharge ports, running radially through the wall of the outer sleeve; when the wall near the bottom of the outer sleeve covers the full-discharge liquid discharge port, the external defined-level liquid discharge ports are respectively of one-to-one correspondence to the positions of the internal defined-level liquid discharge ports;

the wall of the liquid level control rod is slidably placed between the wall of the liquid discharge pipe and the wall of the outer sleeve; the liquid level control rod is provided with a flow guide port running through the wall of the liquid level control rod;

a sliding positioning assembly is arranged between the wall of the outer sleeve and the wall of the liquid level control rod, by means of the sliding positioning assembly, the flow guide port of the liquid level control rod can be positioned respectively between the corresponding internal defined-level liquid discharge ports and external defined-level liquid discharge ports, thus, the internal wall space of the liquid discharge pipe can be connected with the inner space of the liquid container, besides, the internal defined-level liquid discharge ports under the flow guide port are hindered by the wall of the liquid level control rod, and fail to connect with the external defined-level liquid discharge ports; moreover, by means of the sliding positioning assembly, when the flow guide port is located between a pair of internal defined-level liquid discharge port and external defined-level liquid discharge port with the same position, the outer sleeve and liquid level control rod are ganged, so that the outer sleeve can make displacement together with the liquid level control rod along their central axis.

2. The quantitative liquid discharge device capable of discharging liquid in a container at preset liquid level according to claim 1 is characterized in that:

the sliding positioning assembly comprises at least one outwardly projecting boss arranged at the outer wall of the liquid level control rod, at least one radial chute recessed inwardly processed on the inner wall of the outer sleeve, as well as at least one radial circular cylindrical locating slot recessed inwardly processed on the inner wall of the outer sleeve;

the chutes and locating slot are connected; by means of the bosses sliding in the chutes, the liquid level control rod makes axial displacement; when the bosses are inside of the locating slot, the liquid level control rod can only rotate instead of making axial displacement, thus, the flow guide port is located between a pair of internal defined-level liquid discharge port and external defined-level liquid discharge port with the same position.

3. The quantitative liquid discharge device capable of discharging liquid in a container at preset liquid level according to claim 2 is characterized in that:

the liquid discharge pipe is provided with two internal defined-level liquid discharge ports, accordingly, the outer sleeve is also provided with two external defined-level liquid discharge ports;

two parallel chutes stretching axially along the outer sleeve are arranged at the uppermost inner face of the outer sleeve, the locating slot is located under and connected with the two chutes;

two bosses matching respectively with the positions of the said two chutes are arranged on the liquid level control rod; when the two bosses slide into the locating slot from the two chutes, flow guide port of the liquid level control rod is located between the lowest pair of internal defined-level liquid discharge port and external defined-level liquid discharge port.

4. The quantitative liquid discharge device capable of discharging liquid in a container at preset liquid level according to claim 1 is characterized in that:

top nozzle of the liquid discharge pipe is sealed;

bottom nozzle of the liquid discharge pipe stretches out from the bottom surface of the liquid container, serving as the liquid discharge port of the quantitative liquid discharge device; the bottom nozzle is detachably sealed.

5. The quantitative liquid discharge device capable of discharging liquid in a container at preset liquid level according to claim 4 is characterized in that:

It further comprises a spacer, by means of ultrasonic or bonding process, the spacer is installed at the top nozzle of the said liquid discharge pipe, for sealing the top nozzle of the liquid discharge pipe.

6. The quantitative liquid discharge device capable of discharging liquid in a container at preset liquid level according to claim 4 is characterized in that:

It further comprises a rubber stopper, by means of the rubber stopper, bottom nozzle of the said liquid discharge pipe can be detachably sealed.

7. The quantitative liquid discharge device capable of discharging liquid in a container at preset liquid level according to claim 1 is characterized in that:

wall of the liquid discharge pipe comprises a lower liquid discharge pipe wall and an upper liquid discharge pipe wall; outer diameter of the lower liquid discharge pipe wall is greater than that of the upper liquid discharge pipe wall;

Inside bottom wall of the outer sleeve can attach the outside of the lower liquid discharge pipe wall and slide; wall of the liquid level control rod slides between the external surface of the upper liquid discharge pipe wall and internal wall surface of the outer sleeve.

8. The quantitative liquid discharge device capable of discharging liquid in a container at preset liquid level according to claim 1 is characterized in that:

wall of the liquid level control rod comprises a lower control rod wall and an upper control rod wall; inner diameter of the said lower control rod wall is greater than that of the upper control rod wall;

top of liquid discharge pipe is arranged with at least one grab stretching out from the wall of the liquid discharge pipe along the radial direction; outer diameter of the grab is greater than that of the wall of the liquid discharge pipe;

Internal face of the lower control rod wall attaches the external wall of the liquid discharge pipe, sliding under the grab.

9. The quantitative liquid discharge device capable of discharging liquid in a container at preset liquid level according to claim 1 is characterized in that:

the liquid level control rod further comprises a blind nut, the blind nut covers the top nozzle of the liquid level control rod, so that top nozzle of the liquid level control rod is sealed.

10. The quantitative liquid discharge device capable of discharging liquid in a container at preset liquid level according to claim 1 is characterized in that:

seal rings are arranged above and below the full-discharge liquid discharge port, and each internal defined-level liquid discharge port of the liquid discharge pipe.

\* \* \* \* \*